(12) United States Patent  (10) Patent No.: US 7,224,327 B2
Wammes  (45) Date of Patent: May 29, 2007

(54) LIQUID CRYSTAL COLOR DISPLAY SUITABLE FOR NIGHT-SIGHT GLASSES

(75) Inventor: Klaus Wammes, Bechtheim (DE)

(73) Assignee: Siemens Aktiengesellscaft, Munich (DE)

( * ) Notice: Subject to any disclaimer, the term of this patent is extended or adjusted under 35 U.S.C. 154(b) by 201 days.

(21) Appl. No.: 10/965,896

(22) Filed: Oct. 18, 2004

(65) Prior Publication Data

US 2005/0190117 A1 Sep. 1, 2005

Related U.S. Application Data

(63) Continuation of application No. PCT/DE03/01285, filed on Apr. 16, 2003.

(30) Foreign Application Priority Data

Apr. 16, 2002 (DE) ................................. 102 16 821

(51) Int. Cl.
*G09G 5/00* (2006.01)

(52) U.S. Cl. ............................................. 345/8; 345/32

(58) Field of Classification Search .................. 345/87, 345/102, 30, 32, 8; 349/61
See application file for complete search history.

(56) References Cited

U.S. PATENT DOCUMENTS

| 4,934,793 A | 6/1990 | Klein |
| 5,262,880 A | 11/1993 | Abileah |
| 5,661,578 A | 8/1997 | Habing et al. |
| 5,959,711 A * | 9/1999 | Silverstein et al. ......... 349/159 |
| 6,144,359 A | 11/2000 | Grave |
| 6,157,337 A * | 12/2000 | Sato ............................ 341/155 |
| 6,515,662 B1 * | 2/2003 | Garland ..................... 345/427 |
| 6,574,030 B1 * | 6/2003 | Mosier ....................... 359/267 |
| 2003/0071934 A1 * | 4/2003 | Saccomanno et al. ........ 349/61 |
| 2004/0105073 A1 * | 6/2004 | Maddalena et al. ......... 351/205 |

FOREIGN PATENT DOCUMENTS

| EP | 1 139 328 A2 | 10/2001 |
| EP | 1 174 854 A2 | 1/2002 |
| WO | WO 00/21067 A1 | 4/2000 |

\* cited by examiner

*Primary Examiner*—Ricardo Osorio
(74) *Attorney, Agent, or Firm*—Sughrue Mion, PLLC

(57) ABSTRACT

In a night vision goggle compatible color liquid crystal display, liquid crystal cells (10, 11, and 12) are arranged in a matrix in which three adjacent liquid crystal cells are respectively provided with a red, green, and blue filter. The liquid crystal cells are driven by drive circuit (17). The drive circuit (17) is controlled by a control device (15) with red, green, and blue pixel information. The brightness of a backlight source of the color display can be switched from a high value in a daytime operation to a low value for a nighttime operation. To optimize the night vision goggle compatible color liquid crystal display, the control device (15) switches off the driver of the liquid crystal cells with the red filters during the nighttime operation.

20 Claims, 2 Drawing Sheets

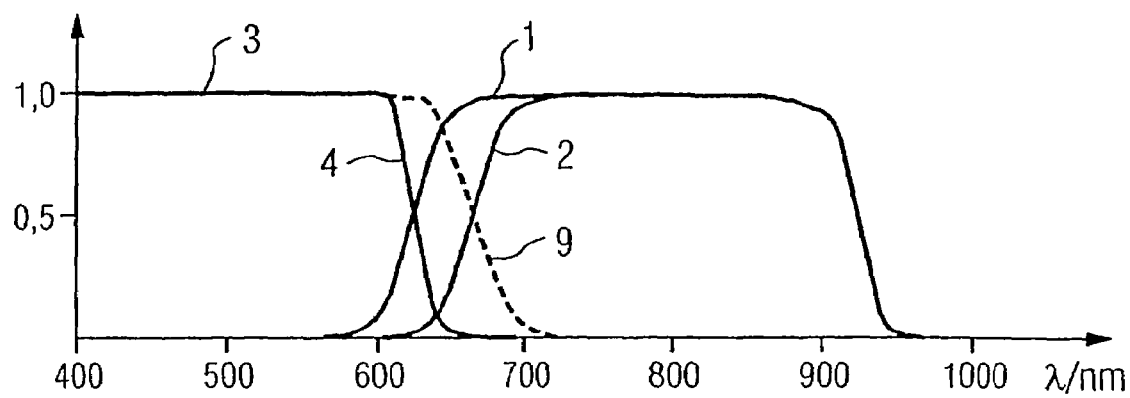
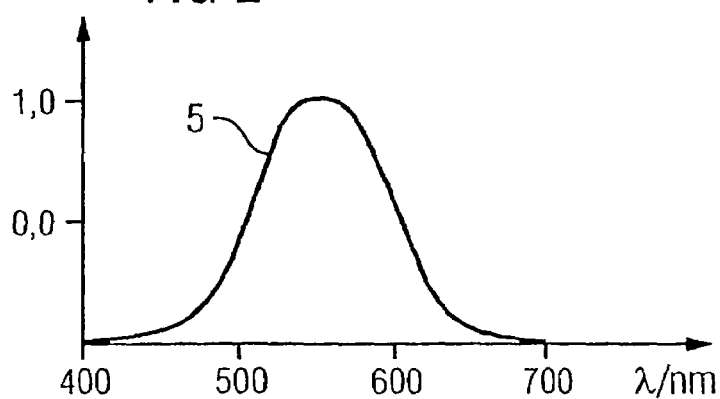
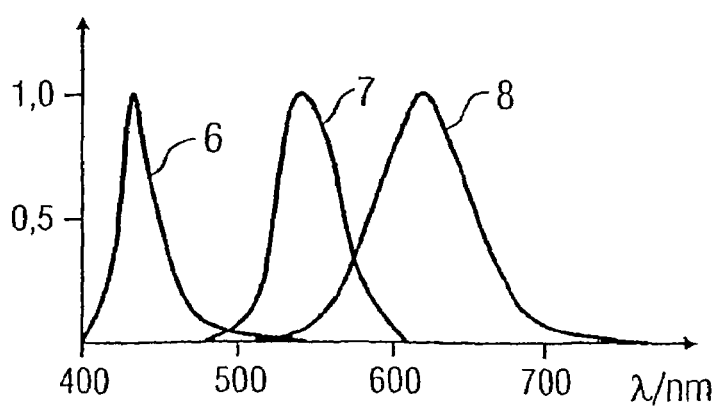

10. Crystal Cell with Red Filter
11. Crystal Cell with Green Filter
12. Crystal Cell with Blue Filter
13. Backlight Source
14. Infrared Absorbing Filter
15. Control Device
16. Unit with Pixel Information
17. Driver Circuit

LIQUID CRYSTAL COLOR DISPLAY SUITABLE FOR NIGHT-SIGHT GLASSES

This is a Continuation of International Application PCT/DE03/01285, with an international filing date of Apr. 16, 2003, which was published under PCT Article 21(2) in German, and the disclosure of which is incorporated into this application by reference.

FIELD AND BACKGROUND OF THE INVENTION

1. Field of the Invention

The present invention relates to a night vision goggle compatible color liquid crystal display. In particular, the present invention relates to a night vision goggle compatible color liquid crystal display having liquid crystal cells arranged in a matrix, in which three adjacent cells are respectively assigned red, green and blue filters and can be driven by a control device with red, green and blue pixel information. The brightness of a backlight source can be switched from a high value during a daytime operation to a low value during a nighttime operation.

2. Description of Related Art

A color liquid crystal display for night vision goggles are known, for example, from U.S. Pat. No. 5,262,880.

Night vision goggles (NVGs) are used in aircraft, particularly military aircraft, to enable the pilot to see out of the aircraft at night. To monitor instruments and displays in the cockpit, the pilot looks past the night vision goggles either below or on the side. Thus, a night vision goggle compatible display requires that it can be seen with the naked eye but is invisible through the night vision goggles.

Night vision goggles convert radiation in the near infrared region of the spectrum into visible light. A so-called minus blue filter is used to block wavelengths shorter than 625 nm in Class A night vision goggles (A NVGs) and wavelengths shorter than 665 nm in Class B night vision goggles (B NVGs). Thus, for the liquid crystal display not to interfere with the NVGs, during the nighttime operation a display must not emit radiation with a wavelength longer than 625 nm for A NVGs or 665 nm for B NVGs.

To ensure that the display emits proper radiation, a respective infrared absorbing filter is provided in the display. Because the 625 nm wavelength is between the visible colors red and orange, red indicator lamps and color displays are not compatible with Class A night vision goggles. In contrast, Class B night vision goggles allow the use of red indicator lamps and color displays in the cockpit because the 665 nm wavelength is approximately in the middle of the red wave length range. In the case of Class B night vision goggles, however, the infrared absorbing filter in the color display must have the steepest possible filtering slope near the 665 nm wavelength, such that the remaining red components of the shorter wavelengths are blocked as little as possible and distortions in the color rendition are largely avoided. Filters of this type with a steep filtering slope—typically dichroic filters—are completely effective only if the radiation passes essentially perpendicularly through the filters.

The display, on the other hand, should be readable within the widest possible viewing angle range. Thus, the color liquid crystal display disclosed in the aforementioned U.S. Pat. No. 5,262,880 uses a collimator to guide the light emitted by the backlight source perpendicularly through the infrared absorbing filter and a diffuser to subsequently diffuse the light uniformly before it reaches the matrix with the liquid crystal cells. Despite these measures, however, the fact remains that, during both nighttime and daytime operations of the color display, the longer-wave red components are blocked and the color rendition is thus distorted.

U.S. Pat. No. 5,661,578 proposes using two different backlight assemblies, one for the nighttime operation and the other for the daytime operation of the color liquid crystal display. In this two backlight assembly, only the backlight assembly for the nighttime operation has an infrared absorbing filter, so that color distortion is excluded at least during the daytime operation of the display.

OBJECTS OF THE INVENTION

One object of the present invention is to use simple solutions to optimize a night vision goggle compatible color liquid crystal display for daytime and nighttime operations.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an illustrative, non-limiting formulation of the present invention, a night vision goggle compatible color liquid crystal display is provided. The display has liquid crystal cells arranged in a matrix, in which three adjacent ones of the liquid crystal cells are respectively assigned a red, green and blue filter. In addition, the display has a driver driving the liquid crystal cells and a control device controlling the driver. The control device has red, green and blue pixel information, and a backlight source switching brightness from a high value during a daytime operation to a low value during a nighttime operation. The control device switches off the driver of the liquid crystal cells with the red filters during the nighttime operation.

According to yet another illustrative, non-limiting formulation of the present invention, the display has viewing means for viewing images and means for transmitting a plurality of colors onto the viewing means; the transmitting means having a plurality of liquid crystal cells arranged in a matrix, where at least three adjacent liquid crystal cells from the plurality of liquid crystal cells are respectively assigned red, green, and blue filter. In addition, the display has means for driving the transmitting means and means for controlling the driver. The control means stores red, green, and blue pixel information, and the control means has means for switching off the means for driving the liquid crystal cells with the red filters during a nighttime operation.

In accordance with the illustrative formulations, the display has a control device configured to switch off the driver of the liquid crystal cells with the red filters during the nighttime operation. In addition, the driver of the liquid crystal cells with the blue filters can also be switched off during the nighttime operation. If the driver of the liquid crystal cells with the red filters is switched off during the nighttime operation, the light in the visible red wavelength range and the immediately adjacent near infrared range emitted by the backlight source cannot exit from the display.

During the nighttime operation the image is thus displayed only in green and blue, or preferably only in green.

Since the human eye is most sensitive to the color green, especially the range of 505 to 555 nm, the brightness of the background light source can be reduced even further during the nighttime operation than would be the case if the image were rendered in color. Blocking the light in the red wavelength range and the immediately adjacent infrared range emanating from the backlight source combined with the increased reduction of the brightness of the background light during nighttime operation has the advantage in that it is possible to use an infrared absorbing filter that transmits visible red wavelengths in the display. In other words, in contrast to the infrared absorbing filters used in the known filters, the filtering slope can be shifted toward longer wavelengths, particularly wavelengths longer than 700 nm. Furthermore, the steepness of the filtering slope is not as important as in the prior art displays, such that standard filters can be used without a collimator.

To avoid losing essential image information during the nighttime operation of the display, the green and blue pixel information used to drive the liquid crystal cells with the green and blue filters is linked to the red pixel information, or the green pixel information used to drive the liquid crystal cells with the green filters is linked to the red and blue pixel information. For example, whereas the red, green and blue pixel information to drive the liquid crystal cells with the red, green and blue filters is conventionally reconstructed from a brightness signal (luminance signal) and color difference signals (chrominance signal) during the daytime operation, the liquid crystal cells with the green filters can be driven with the luminance signal during the nighttime operation. As a result, dispensing with a color display during the nighttime operation is not connected with an appreciable loss of information, especially since green displays are generally superior to white or red displays during the nighttime operation.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements:

FIG. 1 shows examples of the spectral sensitivity of night vision goggles and the transmissivity of an infrared absorbing filter in a night vision goggle compatible color display, FIG. 2 illustrates the spectral sensitivity of the human eye, FIG. 3 shows an example of the transmissivity of the red, green and blue filters in a color liquid crystal display.

DETAILED DESCRIPTION OF ILLUSTRATIVE, NON-LIMITING EMBODIMENTS

Figure 4:
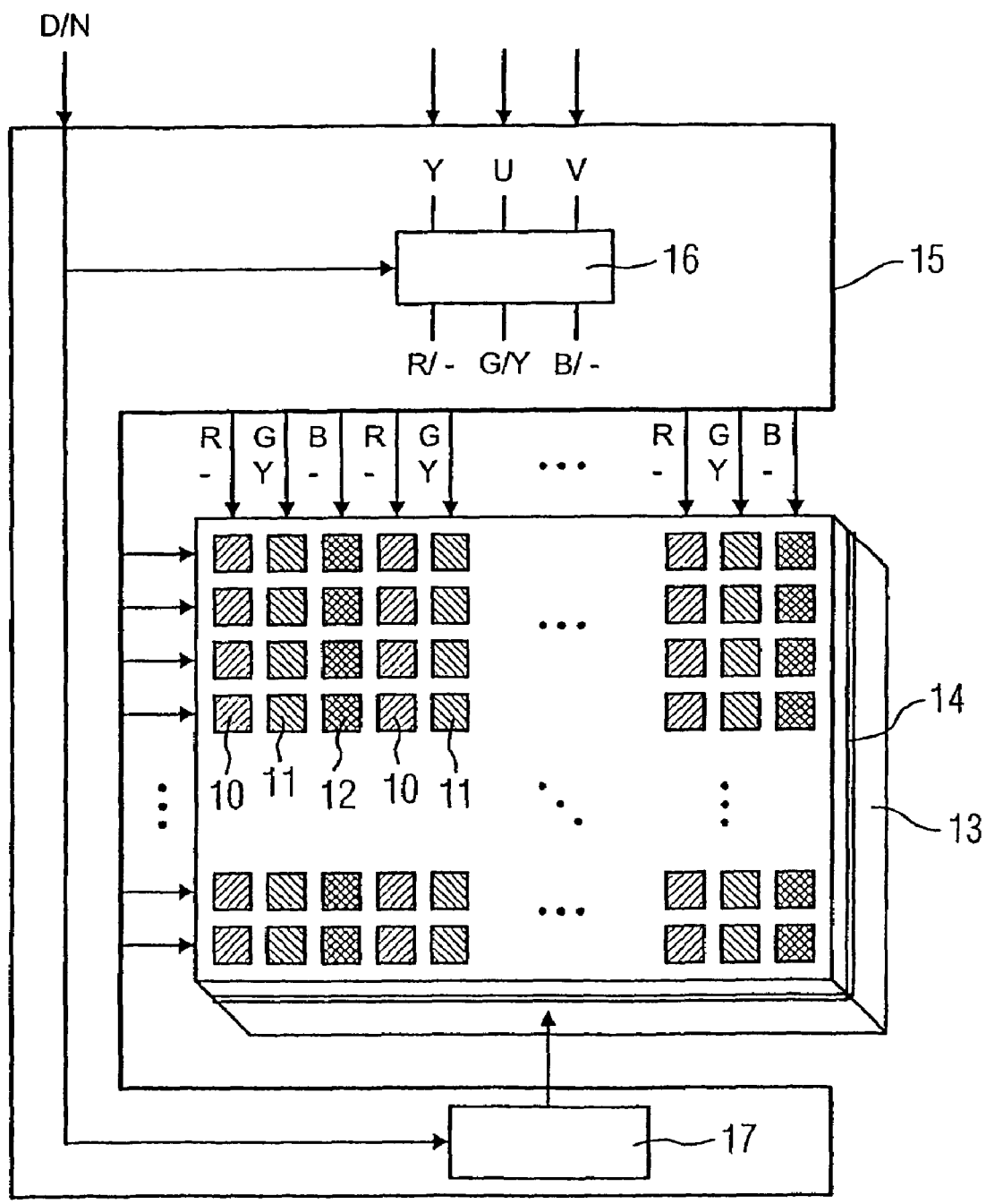
FIG. 4 shows a block diagram of a color liquid crystal display according to an illustrative, non-limiting embodiment of the present invention.

FIG. 1 shows the curve 1 of the spectral sensitivity of Class A night vision goggles which convert infrared radiation up to approximately 930 nm into visible light. A minus blue filter is used to block wavelengths shorter than 625 nm. Curve 2 shows the spectral sensitivity of Class B night vision goggles in which the minus blue filter is used to block wavelengths shorter than 665 nm. To ensure compatibility of the display with night vision goggles, the display should not emit any radiation with a wavelength longer than 625 nm for Class A night vision goggles or 665 nm for Class B night vision goggles during the nighttime operation. To attain the proper radiation of the display, a corresponding infrared absorbing filter whose transmissivity is indicated by curve 3 is used. The sensitivity curves 1 and 2 and the transmissivity curve 3 are normalized to 100% in the figure. Since the 665 nm wavelength is in the middle of the visible red spectrum, Class B night vision goggles allow the use of color displays. However, the infrared absorbing filter (curve 3) retains longer wavelength red components during both nighttime and daytime operation of the color display, so that the color rendition is distorted. The less steep the filtering slope 4 the greater the color distortion.

FIG. 2 shows the spectral sensitivity 5 of the human eye. The sensitivity of the human eye is greatest to the color green in the 505 to 555 nm wavelength range.

FIG. 3 illustrates the transmissivities 6, 7 and 8 of red, green and blue filters assigned to the liquid crystal cells in a color liquid crystal display.

In the color liquid crystal display according to an illustrative, non-limiting embodiment, the driver of the liquid crystal cells with the red filters, and optionally also of the liquid crystal cells with the blue filters is switched off during the nighttime operation. As a result, during the nighttime operation, the color liquid crystal display emits only the green light corresponding to the transmissivity curve 7 and possibly the blue light corresponding to the transmissivity curve 6.

By switching off the liquid crystal cells with the red filters and optionally the liquid crystal cells with the blue filters, the radiation with wavelengths in the visible red spectrum and the adjacent infrared spectral range emitted by the backlight source of the color display is effectively blocked. Moreover, the brightness of the backlight source can be greatly reduced during the nighttime operation because the human eye is most sensitive to the color green. As a result, the filtering slope of the infrared absorbing filter can be shifted towards the longer wavelengths, particularly wavelengths longer than 700 nm, as indicated by a curve 9 illustrated in FIG. 1, such that red components are not suppressed in the color image representation during the daytime operation of the display and color distortion is prevented.

FIG. 4 shows an exemplary, non-limiting embodiment of the color liquid crystal display with liquid crystal cells arranged in rows and columns in a matrix. Three adjacent liquid crystal cells 10, 11, 12 are respectively assigned a red filter, a green filter, and a blue filter. An infrared absorbing filter 14 is disposed between a dimmable backlight source 13 of the color display and the liquid crystal cells 10, 11, 12. The liquid crystal cells 10, 11, 12 are successively addressed line by line by a control device 15 and are driven column by column by alternating red, green, and blue pixel information R, G, B. The liquid crystal cells 10, 11, 12 with the respective red, green and blue filters enable more or less light of the respective color to be transmitted to the viewer depending on the driver.

During the daytime operation, in a unit 16, the red, green and blue pixel information R, G, B is conventionally reconstructed (R=Y−V, G=U+V−Y, B=Y−U) from a brightness signal (luminance signal) Y=R+G+B and from color difference signals (chrominance signal) U=Y−B and V=Y−R. The brightness of the backlight source 13 is adjusted to a high value. For the nighttime operation, a switchover command D/N to the driver circuit 17 is used to switch the brightness of the backlight source 13 to a very low value. At the same time, only the liquid crystal cells 11 with the green filters are driven by the luminance signal Y, such that no appreciable information loss occurs despite the monochrome image representation.

The above description of illustrative, non-limiting embodiments has been given by way of an example. The above and other features of the invention including a device of the various novel components have been particularly described with reference to the accompanying drawings and pointed out in the claims. It will be understood that the particular construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A night vision goggle compatible color liquid crystal display comprising:
    liquid crystal cells arranged in a matrix, in which three adjacent ones of the liquid crystal cells are respectively assigned a red, green and blue filter;
    a driver driving the liquid crystal cells;
    a control device controlling the driver, the control device having red, green and blue pixel information; and
    a backlight source switching brightness from a high value during a daytime operation to a low value during a nighttime operation,
    wherein the control device switches off the driver of the liquid crystal cells with the red filters during the nighttime operation.

2. The night vision goggle compatible color liquid crystal display as claimed in claim 1, wherein the control device links the red pixel information to one of the green pixel information and a combination of the green and the blue pixel information, during the nighttime operation.

3. The night vision goggle compatible color liquid crystal display as claimed in claim 2, further comprising an infrared absorbing and red-transmitting filter.

4. The night vision goggle compatible color liquid crystal display as claimed in claim 3, wherein the control device switches off the driver of the liquid crystal cells with the blue filters during the nighttime operation.

5. The night vision goggle compatible color liquid crystal display as claimed in claim 4, wherein the control device links the red pixel information and the blue pixel information to the green pixel information, during the nighttime operation.

6. The night vision goggle compatible color liquid crystal display as claimed in claim 2, wherein the control device switches off the driver of the liquid crystal cells with the blue filters during the nighttime operation.

7. The night vision goggle compatible color liquid crystal display as claimed in claim 6, wherein the control device links the red pixel information and the blue pixel information to the green pixel information, during the nighttime operation.

8. The night vision goggle compatible color liquid crystal display as claimed in claim 1, further comprising an infrared absorbing and red-transmitting filter.

9. The night vision goggle compatible color liquid crystal display as claimed in claim 8, wherein the control device switches off the driver of the liquid crystal cells with the blue filters during the nighttime operation.

10. The night vision goggle compatible color liquid crystal display as claimed in claim 9, wherein the control device links the red pixel information and the blue pixel information to the green pixel information during the nighttime operation.

11. The night vision goggle compatible color liquid crystal display as claimed in claim 1, wherein the control device switches off the driver of the liquid crystal cells with the blue filters during the nighttime operation.

12. The night vision goggle compatible color liquid crystal display as claimed in claim 11, wherein the control device links the red pixel information and the blue pixel information to the green pixel information during the nighttime operation.

13. The night vision goggle compatible color liquid crystal display as claimed in claim 1, wherein the liquid crystal cells with a respective filter emit a respective color onto a viewer to monitor instruments of an aircraft.

14. The night vision goggle compatible color liquid crystal display as claimed in claim 13, wherein, during the nighttime operation, red, green, and blue pixel information is emitted in green color onto the viewer, and wherein, during the daytime operation, red, green, and blue pixel information is emitted in a respective color onto the viewer.

15. A night vision goggle compatible color liquid crystal display comprising:
    viewing means for viewing images;
    means for transmitting a plurality of colors onto the viewing means; the transmitting means having a plurality of liquid crystal cells arranged in a matrix, in which at least three adjacent ones of the liquid crystal cells are respectively assigned red, green, and blue filters;
    means for driving the transmitting means;
    means for controlling the driver, in which the control means stores red, green, and blue pixel information and in which the control means comprises means for switching off the means for driving the liquid crystal cells with the red filters during a nighttime operation.

16. The night vision goggle compatible color liquid crystal display according to claim 15, further comprising means for providing a backlight source to illuminate the viewer,
    and means for switching brightness of the backlight source means from a high value during a daytime operation to a low value during the nighttime operation.

17. The night vision goggle compatible color liquid crystal display as claimed in claim 16, wherein the control means further comprises means for linking the red pixel information to one of the green pixel information and a combination of the green and the blue pixel information, during the nighttime operation.

18. The night vision goggle compatible color liquid crystal display as claimed in claim 16, further comprising an infrared absorbing and red-transmitting filter.

19. The night vision goggle compatible color liquid crystal display as claimed in claim 16, wherein the control means further comprises means for switching off driving of the liquid crystal cells with the blue filters during the nighttime operation.

20. The night vision goggle compatible color liquid crystal display as claimed in claim 19, wherein the control means further comprises means for linking the red and the blue pixel information to the green pixel information during the nighttime operation.

* * * * *